United States Patent Office 3,555,093
Patented Jan. 12, 1971

3,555,093
2,α-DIMETHYL-β-ETHYL-β-(p-FLUOROPHENYL)-
ETHYLAMINES AND THE SALTS THEREOF
Yvon Jean L'Italien, Wayne, Mich., assignor to Parke,
Davis & Company, Detroit, Mich., a corporation of
Michigan
No Drawing. Filed May 26, 1967, Ser. No. 641,478
Int. Cl. C07c 87/28
U.S. Cl. 260—570.8                           10 Claims

ABSTRACT OF THE DISCLOSURE

Phenethylamines (I) and salts are prepared:

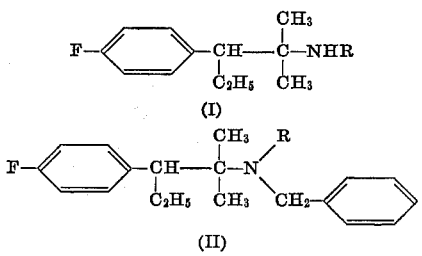

by reducing a benzylamine (II), 2,2-dimethyl-3-ethyl-3-(p - fluorophenyl)aziridine, N-[α,α-dimethyl-β-ethyl-β-(p-fluoro)phenethyl]formamide or N-methylene-α,α-dimethyl-β-ethyl-β-(p-fluoro)phenethylamine or by hydrolyzing N-[α,α - dimethyl-β-ethyl - β - (p - fluoro)phenethyl]formamide or an immonium salt (III):

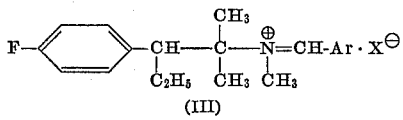

where R is hydrogen or methyl, Ar is aryl and X⁻ is an anion. The compounds are pharmacological agents having anorexic properties. They exist in the racemic (dl) form and optically active (d and l) forms.

---

This invention relates to novel phenethylamine compounds and processes for producing the same. More particularly the invention relates to α,α-dimethyl- and N,α,α-trimethyl-β-ethyl-β-(p-fluoro)phenethylamines and their acid addition salts which compounds in free base form have the formula:

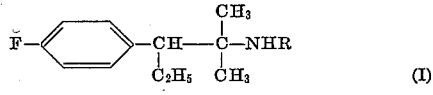

where R is a hydrogen atom or a methyl group.

The free base compounds of the invention form acid addition salts by reaction with organic and inorganic acids. Some examples of the acid addition salts of the invention are the inorganic acid salts such as the hydrochloride, hydrobromide, hydroiodide, sulfate and phosphate, and the organic acid salts such as the carbonate, succinate, benzoate, acetate, citrate, malate, maleate, p-toluenesulfonate, benzenesulfonate and sulfamate. The acid addition salts are conveniently formed by mixing the free base with at least an equivalent amount of the acid in a solvent in which the salt is insoluble, particularly after chilling, thereby permitting recovery of the desired salt as a solid phase. The acid addition salts can be converted to the corresponding free bases by reaction with a basic reagent such as aqueous ammonia. Whereas both the free base and salt forms of the products are useful for the purposes of the invention, the salts are generally preferred in those cases where solid and essentially neutral product forms, as well as increased water solubility, are desired. The invention contemplates the acid salts broadly. Those salts which are unsuited to particular uses, as for example uses where toxicity is a problem, are nevertheless useful as intermediates, being readily convertible to non-toxic acid salts by means which per se are known to those in the art.

The compounds of the invention are useful as pharmacological agents. They exhibit an appetite-depressant or anorexic effect when administered at well tolerated doses by either the oral or the parenteral route and hence have application as agents for weight control. The anorexic action of the compounds is desirably free of CNS-depression and relatively free of CNS stimulation. Also, the action ordinarily takes place without emesis and has long duration. The compounds exist in the optically inactive or racemic (dl) form and also in the form of the corresponding optically active d- and l-isomers. For purposes of the invention, the d- and dl-forms of the products are preferred.

The compounds of the invention are prepared by reducing benzylamine compounds having the formula:

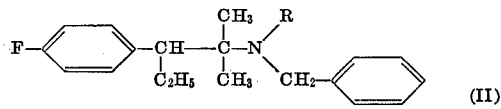

in the presence of a catalyst using hydrogen gas; where R has the above-specified significance. The reduction is conveniently carried out in a compatible solvent such as methanol or glacial acetic acid with palladium on charcoal or Raney nickel catalyst. The reduction using methanol as a solvent is facilitated by addition of a small amount of acid such as sulfuric or acetic acid. The time, temperature and pressure for the reaction can be varied considerably. For example, reduction using palladium as a catalyst is conveniently carried out at temperatures in the range from 20–60° C. and hydrogen pressures in the range from 1 to 10 atmospheres, preferably at room temperature and 50 lbs. per square inch of hydrogen. The reduction using Raney nickel as a catalyst is carried out at temperatures in the range from 135–200° C. and at hydrogen pressures of 1 to 170 atmospheres.

Also according to the invention, compounds having Formula I where R is a hydrogen atom are prepared by subjecting N - [α,α-dimethyl-β-ethyl-β-(p-fluoro)phenethyl]-formamide to hydrolysis. Hydrolysis is conveniently carried out using an acid or base catalyst. The hydrolysis using an acid catalyst is generally preferred since it requires shorter reaction periods and lower reaction temperatures. For acid hydrolysis mineral acids such as hydrochloric, sulfuric and phosphoric are employed. For basic hydrolysis a strong alkali such as potassium or sodium hydroxide is employed. The hydrolysis in accordance with the invention is carried out in a suitable solvent such as water, a lower alkanol or glycol or a mixture of such solvents. For acid catalysis the preferred solvent is water in excess, whereas for base catalysis diethylene glycol is a preferred solvent. The time and temperature used for hydrolysis can be varied considerably. Temperatures in the range from 50–250° C. and higher are ordinarily employed for reaction times of 3 hours or more. Acid catalyzed hydrolysis is preferably carried out in temperatures in the range from 75–125° C. whereas base catalyzed hydrolysis is carried out at temperatures exceeding 175° C. At the preferred reaction temperatures hydrolysis is ordinarily complete using an acid catalyst in from 3–5 hours and using a basic catalyst in 8–16 hours.

Further according to the invention, compounds having Formula I where R is a hydrogen atom are prepared by reducing 2,2-dimethyl-3-ethyl-3-(p-fluorophenyl)aziridine in the presence of a catalyst using hydrogen gas. The reduction is carried out in a suitable solvent such as glacial acetic acid, a lower alkanol, a mixture of acid and a lower alkanol, or a mixture of glacial acetic acid and sulfuric acid. A preferred solvent is a 30:1 mixture of glacial acetic acid and sulfuric acid. A noble metal catalyst is used for the reaction, preferably palladium on charcoal. The reaction conditions may be varied considerably. Temperatures in the range from 20–70° C. and hydrogen pressures in the range from 1–170 atmospheres may be used. The reduction is preferably carried out at 40° C. and at a hydrogen pressure of 50 lbs. per square inch under which conditions the reduction is complete in 24 hours.

Still further according to the invention, compounds having Formula I where R is a methyl group are prepared by reducing N-[α,α-dimethyl-β-ethyl-β-(p-fluoro)-phenethyl]formamide using lithium aluminum hydride or lithium aluminum hydride-aluminum chloride. The reduction is carried out in an inert solvent such as ether, tetrahydrofuran, dioxane, dimethoxy ethane or diethylene glycol dimethyl ether. Ether is a preferred solvent. The reaction is carried out using at least one equivalent of lithium aluminum hydride for each mole of the formamide starting material. Large excesses of lithium aluminum hydride may be used, a two-fold molar excess being preferred. Following completion of the reaction any excess lithium aluminum hydride is destroyed by addition of water or aqueous solvent such as aqueous ether, aqueous ethyl acetate or aqueous ether-ethanol mixture and the reaction mixture is decomposed using excess aqueous alkali.

The compounds of the invention having Formula I where R is a methyl group are also produced by the reduction of N-methylene-α,α-dimethyl - β - ethyl-β-(p-fluoro)phenethylamine. The reduction is carried out using any of a variety of catalytic agents such as sodium borohydride, sodium in alcohol, aluminum amalgam, magnesium-magnesium iodide, lithium aluminum hydride and formic acid. Sodium borohydride is preferred. The reduction is carried out using a compatible solvent such as diethyl ether, tetrahydrofuran, dioxane, ethanol or water. The preferred solvent using sodium borohydride is ethanol. The reaction conditions are subject to considerable change. The reduction may be carried out at temperatures in the range from 0–100° C. and for times varying from 1–60 hours or longer. Reduction with sodium borohydride at room temperature is complete in 3–5 hours.

According to still another embodiment of the invention, the compounds having Formula I where R is a methyl group are produced by hydrolysis of an immonium salt having the formula:

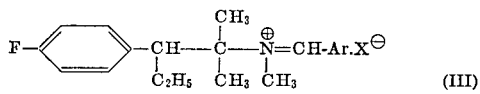

(III)

where Ar is an unsubstituted aryl group or an aryl group substituted with lower alkyl, lower alkoxy, halogen or nitro groups and X⁻ is a halide, sulfate, sulfonate or p-toluene-sulfonate anion. The hydrolysis is carried out in water, an aqueous acid medium, or an aqueous water miscible organic solvent. For the acid medium a mineral acid such as hydrochloric, phosphoric or sulfuric acid is conveniently used or an aqueous solution of an organic acid such as p-toluenesulfonic acid or acetic acid. Illustrative water miscible organic solvents for the hydrolysis are the lower alkanols, lower alkanones or ethers. Aqueous hydrochloric acid is a preferred hydrolysis medium. The hydrolysis may be carried out under a variety of conditions. The proportion of aqueous medium used is not critical and in general a large excess is preferred. The reaction temperatures can range from 0–125° C. or higher, the reaction time at this temperature range being from 10 minutes to about 24 hours. The preferred hydrolysis temperature is about 95° C. at which temperature hydrolysis is complete in 1 hour.

The free base compounds of the invention in their racemic (dl) form can be separated into their individual d- and l-optical isomers by resolution with an optically active acid resolution agent such as the d- or l-form of tartaric acid or similar organic acid. Resolution is carried out by forming a warm solution of equimolar amounts of the free base and optically active acid in an hydroxylic solvent and cooling the solution to cause acid salt of one of the optical isomers to crystallize out. The crystalline product is converted to the free base by neutralization of an aqueous solution of the salt with a base, extraction of the organic phase with non-aqueous solvent, and recovery of the free base optical isomer from the extract, if desired after conversion of the free base to an acid addition salt by reaction with a selected acid.

The invention is illustrated by the following examples.

EXAMPLE 1

(a) A mixture of N-benzyl-α,α-dimethyl-β-ethyl-β-(p-fluoro)phenethylamine (28.5 g.) 1 g. of 20% palladium on carbon, and methanol (200 ml.) is hydrogenated at a hydrogen pressure of 50 lbs. per square inch until the theoretical amount of hydrogen is absorbed. The catalyst is removed, the filtrate is concentrated by evaporation and the residue [dl-α,α-dimethyl-β-ethyl-β-(p-fluoro)phenethylamine] is taken up in ether, dried over anhydrous sodium sulfate, treated with anhydrous hydrogen chloride and the product which precipitates collected by filtration. The product, dl-α,α-dimethyl-β-ethyl-β(p-fluoro)-phenethylamine hydrochloride, melts at 221–222° C. after recrystallization from isopropanol. The corresponding hydrobromide salt is obtained by treating an ethereal solution of the free base with an equivalent of hydrogen bromide. Removal of the solvent leaves the hydrobromide salt.

(b) The starting material for (a) above can be prepared from known materials as follows:

A suspension of anhydrous aluminum chloride (116 g.) in 400 ml. of ethylene dichloride at 15° C. is mixed with fluorobenzene (74 g.). This mixture is treated dropwise with isobutyryl chloride (82.2 g.) while maintaining the reaction temperature at 15° C. After addition is complete the resulting solution is stirred for about 6 hours at 15° C. and then poured into 2 liters of ice water containing 80 ml. of concentrated hydrochloric acid. The organic layer is separated and the aqueous layer extracted with four 300-ml. portions of ether. The extracts are combined with the organic layer and washed with water (500 ml.), sodium hydroxide solution (2 N, 500 ml.) and two 300-ml. portions of saturated saline solution. The washed extracts are dried over anhydrous magnesium sulfate and are then concentrated and distilled. The desired product, p-fluoroisobutyrophenone, is collected as the fraction boiling at 111° C. (24 mm. of mercury). A 50% ethereal solution of p-fluoroisobutyrophenone (245 g.) is added dropwise to freshly prepared ethyl magnesium bromide in ether [prepared from ethyl bromide (218 g.) and magnesium (48.6 g.)]. After addition is complete, the reaction mixture is allowed to stir overnight and is then decomposed with 275 ml. of saturated ammonium chloride solution. The resulting oil is separated, dried over anhydrous potassium carbonate and subjected to distillation. The desired product, 1-ethyl-1-(p-fluorophenyl)-2-methyl-propan-1-ol, is collected as the fraction boiling at 87–88° C. (0.8 mm. of mercury). A mixture of 1-ethyl-1-(p-fluorophenyl)-2-methylpropan-1-ol (97 g.), p-toluenesulfonic acid (1 g.), and toluene (500 ml.) are refluxed with a Dean-Starke apparatus until the theoretical amount of water is collected in the trap. On cooling the reaction mixture is treated with a solution of 5 sodium hydroxide and then with water. The resulting organic phase is concentrated and distilled. The fraction distilling at 77–78° C. at 8 mm. of mercury pressure is collected and dissolved in 260 ml. of glacial acetic acid at 5° C. and treated dropwise with 785 ml. of a 1:2 mixture of acetic acid-sulfuric acid while maintaining the temperature below 15° C. After stirring at room temperature overnight, the mixture is poured onto crushed ice and neutralized with 20% sodium hydroxide solution. The neutralized mixture is extracted with ether, the extract treated with charcoal and the product isolated by removal of ether. The product is 2-methyl-3-(p-fluorophenyl)-2-pentene; a solution of 59.5 g. of the prdouct in 45 ml. of glacial acetic acid maintained at 0° C. is treated with 40 g. of benzonitrile while maintaining the reaction temperature below 15° C. While the reaction mixture is maintained at this temperature, 135 ml. of a 1:2 solution of acetic acid:sulfuric acid is added dropwise. Following addition, the mixture is stirred overnight and is then poured onto ice and neutralized with 20% sodium hydroxide solution. The neutral mixture is extracted with ether and the ether extracts concentrated. The residual product, N-[α,α-dimethyl-β-ethyl-β-(p-fluoro)phenethyl] - benzamide, melts at 90–92° C. A suspension of 3.8 g. of lithium aluminum hyride, 4.8 g. of aluminum chloride in 50 ml. of tetrahydrofuran is prepared and is stirred for 15 minutes, following which N-[α,α-dimethyl-β-ethyl - β - (p-fluoro)phenethyl]benzamide (10 g.) in tetrahydrofuran (20 ml.) is added dropwise. After addition is complete, the mixture is refluxed 3 hours and then diluted with ether. Decomposition with 4 ml. of water, 3 ml. of 20% sodium hydroxide and then 14 ml. of water is followed by ether extraction of the resulting mixture and removal of the ether from the extracts by evaporation. The residual product is N-benzyl-α,α-dimethyl-β-ethyl-β-(p-fluoro)phenethylamine.

EXAMPLE 2

(a) A mixture of 29.9 g. of N-benzyl-N-α,α-trimethyl-β-ethyl-β-(p-fluoro)phenethylamine, 1 g. of 20% palladium on carbon, and 500 ml. of methanol is hydrogenated at 50 lbs. per square inch of hydrogen pressure until the theoretical amount of hydrogen is absorbed. The catalyst is removed and the filtrate concentrated by evaporation. The residual product is taken up in ether. The ether extracts are concentrated by evaporation and distilled. The fraction boiling at 122–123° C. (12 mm. of mercury) constitutes the desired product, dl-N,α,α-trimethyl-β-ethyl-β-(p-fluoro)phenethylamine. The corresponding acetate salt is obtained by dissolving the free base in excess aqueous acetic acid and concentrating the solution to dryness under reduced pressure.

(b) The starting material for (a) can be prepared as follows:

A mixture of N-benzyl - α,α - dimethyl-β-ethyl-β-(p-fluoro) - phenethylamine [28.5 g., Example 1(b)] and 37% aqueous formaldehyde solution (10 ml.) is treated with formic acid (10 ml.). Gas is evolved from the reaction mixture and when this ceases the solution is heated one-half hour at 95° C. and is then diluted by addition of concentrated hydrochloric acid (25 ml.). The mixture is heated at 95° C. an additional one-half hour and is then concentrated and the residue dissolved in water. The solution is treated with 20% sodium hydroxide solution, the neutralized solution is extracted with ether and the ether extracts concentrated to provide N-benzyl-α,α-N-trimethyl-β-ethyl-β-(p - fluoro)phenethylamine as the residual product.

EXAMPLE 3

(a) A mixture of 30 g. of N-[α,α-dimethyl-β-ethyl-β-(p-fluoro)phenethyl]formamide, 250 ml. of water and 50 ml. of concentrated hydrochloric acid is heated under reflux until a clear solution is obtained (3–5 hours). The cooled solution is washed with ether and concentrated. The residual product is dl-α,α-dimethyl-β-ethyl-β-(p-fluoro)phenethylamine hydrochloride; M.P. 221–223° C. after recrystallization from isopropanol. To obtain the corresponding free base product the hydrochloride salt is dissolved in water and neutralized by treatment with 5% sodium hydroxide solution. The mixture is extracted with ether, the extracts are dried over anhydrous sodium sulfate and the free base is isolated by concentrating the extracts.

(b) The optical isomers of the free base product of (a) are obtained by resolving the racemic free base with an optically active isomer of tartaric acid as follows:

19.5 g. of dl-α,α-dimethyl-β-ethyl-β-(p-fluoro)-phenethylamine is added to a solution of 15 g. of d-tartaric acid in hot water. A solid mass which forms is dissolved in methanol and the resulting solution treated with charcoal and cooled to yield a crystalline product, l-α,α-dimethyl-β-ethyl-β-(p-fluoro)phenethylamine d - tartrate; M.P. 200–201° C. after recrystallization from isopropanol-methanol or from water; optical rotation:

$$[\alpha]_D^{25} = +4.85°$$

c.=1% in methanol. 2 g. of the tartrate salt product is dissolved in water and the solution treated with excess 5% sodium hydroxide solution. The resulting mixture is extracted with ether and the ether extracts dried over anhydrous sodium sulfate, filtered and the filtrate concentrated. The residual product is l-α,α-dimethyl-β-ethyl-β-(p-fluoro)phenethylamine.

By the same procedure but replacing d-tartaric acid with the same amount of l-tartaric acid the product obtained is d - α,α - dimethyl-β-ethyl-β-(p-fluoro)phenethylamine l-tartrate; M.P. 203–204° C.; $[\alpha]_D^{25} = -6.0°$; c.=1% in methanol. The tartrate salt product is dissolved in hot water and treated with 5% sodium hydroxide solution. The resulting neutralized mixture is extracted with ether, the ether extracts are dried over anhydrous sodium sulfate and the dried extracts are filtered and concentrated. The residual product is d-α,α-dimethyl-β-ethyl-β-(p-fluoro)phenethylamine.

(c) The formamide starting material for (a) can be prepared as follows:

A solution of 1-ethyl-1-(p-fluorophenyl)-2-methyl-propan-1-ol [248 g., Example 1(b)] in glacial acetic acid (170 ml.) maintained at 10° C. is treated with sodium cyanide (74 g.). The resulting mixture is stirred while 510 ml. of a 1:2 mixture of acetic acid:sulfuric acid is added dropwise, the addition being accomplished while maintaining a temperature below 15° C. The reaction mixture is allowed to stand overnight with stirring and is then poured over 3 liters of ice water and the mixture extracted with ether. The extracts are washed twice with dilute sodium hydroxide solution, then with water and finally dried over anhydrous potassium carbonate. The extracts are then filtered and the ether removed and the residue treated with isooctaine. The resulting mixture is filtered and the filtrate distilled. The product, N-[α,α-dimethyl-β-ethyl-β-(p-fluoro)phenethyl]formamide, is obtained as the fraction boiling at 132–135° C. (0.3 mm. of mercury).

EXAMPLE 4

A mixture of N-[α,α-dimethyl-β-ethyl-β-(p-fluoro)-phenethyl]formamide (18 g.), potassium hydroxide (15 g.) and diethylene glycol (160 ml.) is heated overnight at reflux temperature. The reaction mixture is cooled, diluted with 480 ml. of water, and extracted with 3 volumes of ether. The extracts are dried over anhydrous potassium carbonate, filtered and the filtrate concentrated and distilled. The product, dl-[α,α-dimethyl-β-ethyl-(p-fluoro)-phenethylamine, is obtained as the fraction boiling at 108–110° C. (10 mm. of mercury). The corresponding hydrochloride salt is obtained by treating a solution of the free base product in isooctane containing a small amount of ether, with an hydrous hydrogen chloride. The hydrochloride salt product which separates is collected and recrystallized from isopropanol/isooctane; M.P. 221–222° C.

EXAMPLE 5

(a) A mixture of 2,2-dimethyl-3-ethyl-3-(p-fluorophenyl)-aziridine (37 g.), 2 g. of palladium on charcoal, glacial acetic acid (300 ml.) and concentrated sulfuric acid (10 ml.) is hydrogenated at 40° C. and 50 lbs. per square inch of hydrogen pressure for 24 hours. The reaction mixture is filtered and the filtrate is concentrated to a volume of about 50 ml. The desired product, $dl$-α,α-dimethyl-β-ethyl-β-(p-fluoro)phenethylamine sulfuric acid salt, is obtained by collecting the crystalline product which separates on standing; M.P. 178–179° C.

(b) The aziridine starting material for (a) can be obtained as follows:

A mixture of 110.5 g. of p-fluoroisobutyrophenone [Example 1(b)], 100 ml. of 1,1-dimethylhydrazine and 0.5 g. of p-toluenesulfonic acid is refluxed for 3 days, cooled and diluted with ether. The ether mixture is washed 3 times with water, dried over anhydrous potassium carbonate, filtered and the filtrate concentrated. p-Fluoroisobutyrophenone dimethylhydrazone is obtained as the fraction distilling at 109–113° C. (15 mm. of mercury). A solution of 116 g. of the dimethylhydrazone product in 50 ml. of acetonitrile is slowly treated at room temperature with 85 g. of methyl iodide. The mixture is allowed to stand overnight and the desired product, p-fluoroisobutyrophenone trimethylhydrazonium iodide, is collected by filtration; M.P. 105–115° C. A solution of sodium isopropoxide [formed by addition of 7.2 g. of sodium to 500 ml. of isopropanol] is added at 0–15° C. to a suspension of 121 g. of p-fluoroisobutyrophenone trimethylhydrazonium iodide in 500 ml. of isopropanol. The resulting mixture is stirred 1 hour at room temperature, the isopropanol is removed by evaporation and the mixture is then diluted with 500 ml. of water. The resulting aqueous mixture is extracted with ether and the ether extracts are washed with three 200-ml. portions of water and dried over anhydrous magnesium sulfate. The extracts are then filtered and the filtrate concentrated by removal of ether. The product, 2,2-dimethyl-3-(p-fluorophenyl)azirine, is obtained as the fraction boiling at 88° C. (13 mm. of mercury). A freshly prepared solution of ethyl magnesium bromide [prepared from ethyl bromide (54.5 g.) and magnesium turnings (12.2 g.)] in 250 ml. of ether is carefully added to a solution of 42.3 g. of 2,2-dimethyl-3-(p-fluorophenyl)azirine in 350 ml. of ether. The reaction mixture is stirred for 1 hour, treated with 70 ml. of concentrated ammonium chloride solution, and the ethereal phase is decanted, concentrated and distilled. 2,2-dimethyl-3-(p-fluorophenyl)-3-ethylaziridine is obtained as the fraction boiling at 111–113° C. (13 mm. of mercury).

EXAMPLE 6

(a) A solution of $dl$-N-[α,α-dimethyl-β-ethyl-β-(p-fluoro)-phenethyl]formamide (196 g.) in ether (500 ml.) is added dropwise with stirring to a suspension of lithium aluminum hydride (76 g.) in 2 liters of ether. Following addition, the mixture is stirred at room temperature for 3 hours and the mixture is then decomposed by addition of 80 ml. of water, 60 ml. of 20% sodium hydroxide solution and 280 ml. of water. The resulting mixture is filtered and the ethereal layer in the filtrate is collected, concentrated and distilled. The product, $dl$-N,α,α-trimethyl-β-ethyl-β-(p-fluoro)phenethylamine, is collected as the fraction boiling at 122–123° C. (12 mm. of mercury).

(b) To obtain the corresponding optical isomers the racemic free base product of (a) is resolved using tartaric acid as the resolving agent as follows:

A hot solution of $l$-tartaric acid (15 g.) in isopropanol (200 ml.) is treated with 20.8 g. of the racemic free base product. The mixture is cooled and the resulting supernatant liquid is removed by decantation and is discarded. The residual product is redissolved in hot isopropanol and allowed to stand overnight at 0–5° C. The supernatant alcohol is decanted and the residual product is crystallized by trituration with hot isopropanol. Further recrystallization from isopropanol provides the salt, $l$-N,α,α-trimethyl-β-ethyl-β-(p-fluoro)-phenethylamine $l$-tartrate; M.P. 165–167° C., $[α]_D^{25} = -16.4°$, c.=1% in methanol. The salt is dissolved in water, neutralized with 5% sodium hydroxide solution and extracted with ether. The ether extracts are dried over anhydrous potassium carbonate, filtered and treated with anhydrous hydrogen chloride. The desired product which separates, $l$-N,α,α-trimethyl-β-ethyl-β-(p-fluoro)phenethylamine hydrochloride, is collected by filtration; M.P. 207–211° C., $[α]_D^{25} = -5.4°$, c.=1% in methanol.

Cautious addition of the racemic free base, N,α,α-trimethyl-β-ethyl-β-(p-fluoro)phenethylamine (140 g.) to a swirling, hot solution of 100 g. of $d$-tartaric acid in 500 ml. of hot isopropanol yields a solution which is cooled at 0–5° C. for 2–3 days. The product which precipitates, $d$-N,α,α-trimethyl-β-ethyl-β-(p-fluoro)phenethylamine $d$-tartrate, is collected and recrystallised from isopropanol; M.P. 158–165° C., $[α]_D^{25} = +16.4°$, c.=1% in methanol. An aqueous solution of this tartrate salt is neutralized with 20% sodium hydroxide solution and is then extracted with ether. The ether extracts are dried over anhydrous potassium carbonate, filtered and acidified with hydrogen chloride. The resulting product which precipitates, $d$-N,α,α-trimethyl-β-ethyl-β-(p-fluoro)phenethylamine hydrochloride, is collected and recrystallized from isopropanol; M.P. 212–213° C., $[α]_D^{25} = +7.0°$, c.=1% in methanol.

EXAMPLE 7

(a) A mixture of 10.36 g. of N-methylene-α,α-dimethyl-β-ethyl-β-(p-fluoro)phenethylamine, 50 ml. of ethanol and 2.5 g. of sodium borohydride is allowed to stand for 60 hours. The alcohol is then removed by evoporation and the residue decomposed by addition of 10 ml. of 50% sodium hydroxide solution and 20 ml. of water. The resulting mixture is extracted with ether and the extracts dried over anhydrous potassium carbonate. The dried extracts are filtered and the filtrate treated with anhydrous hydrogen chloride. The resulting product, $dl$-N,α,α-trimethyl-β-ethyl-β-(p-fluoro)phenethylamine hydrochloride, is obtained in crystalline form upon stirring; M.P. 162–164° C. The corresponding free base is obtained by treating an aqueous solution of the hydrochloride salt with excess aqueous alkali, extracting with ether, drying the extracts and recovering the free base as a fractional distillate of the extracts; B.P. 122–123° C. (12 mm. of mercury).

(b) The starting material for (a) can be obtained as follows:

A mixture of 9.75 g. of $dl$-α,α-dimethyl-β-ethyl-β-(p-fluoro)phenethylamine, 1.65 g. of paraformaldehyde, and 200 ml. of benzene is heated under reflux in a Dean-Starke apparatus until the expected amount of water is collected in the Dean-Starke trap (about 1 hour). Removal of the solvent from the reaction mixture by concentration yields the N-methylene starting material for (a).

EXAMPLE 8

(a) A suspension of 44.7 g. of N-benzylidene-α,α-dimethyl-β-ethyl-β-(p-fluoro)phenethylamine methiodide, 140 ml. of water and 10 ml. of concentrated hydrochloric acid is heated at 95° C. for 1 hour. The resulting two phase system is washed with ether. The aqueous phase is basified and the resulting mixture is extracted with ether. The organic extracts are dried over anhydrous potassium carbonate, filtered and the filtrate concentrated and distilled. The desired product, $dl$-N,α,α-trimethyl-β-ethyl-β-(p-fluoro)phenethylamine, is obtained as the fraction boiling at 122–123° C. (12 mm. of mercury). The corresponding mandelate salt is obtained by treating an ethereal solution of the free base with an ethereal solution of one equivalent of mandelic acid. The mandelate salt which separates is collected by filtration and recrystallized from isopropanol/isooctane.

(b) The benzylidene starting material for (a) can be prepared as follows:

A mixture of 30 g. of $dl$-α,α-dimethyl-β-ethyl-β-(p-fluoro)phenthylamine, 16 g. of benzaldehyde and 300 ml.

of benzene is heated under reflux in a Dean-Starke apparatus until the theoretical amount of water is collected in the trap (about 3 hours). The solvent is removed from the reaction mixture to provide as a residual product dl-N - benzylidene - α,α - dimethyl-β-ethyl-β-(p-fluoro) phenethylamine. 42.5 g. of the latter product in a mixture with 71 g. of methyl iodide and 10 ml. of acetonitrile is heated at reflux for 50 hours and the reaction mixture is concentrated to one-half volume and then diluted with ether to cause the precipitation of the desired product, dl - N - benzylidene - α,α - dimethyl-β-ethyl-β-(p-fluoro) phenethylamine methiodide, as a heavy yellow flocculent material. The precipitated product is isolated by decantation of the solvent and is purified by washing with ether. The resulting product is sufficiently pure for use as a starting material for (a).

I claim:
1. Phenethylamine compounds and acid addition salts thereof having in free base form the formula:

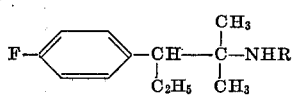

where R represents a hydrogen atom or a methyl group.

2. α,α - Dimethyl-β-ethyl-β-(p-fluoro)-phenethylamine compounds according to claim 1.

3. The free base compound according to claim 1 α,α-dimethyl-β-ethyl-β-(p-fluoro)phenethylamine.

4. d-α,α-Dimethyl - β - ethyl-β-(p-fluoro)phenylamine compounds according to claim 1.

5. dl-α,α-Dimethyl-β-ethyl-β-(p-fluoro)phenethylamine compounds according to claim 1.

6. N,α,α-trimethyl - β - ethyl-β-(p-fluoro)phenethylamine compounds according to claim 1.

7. The free base compound according to claim 1 N,α,α-trimethyl-β-ethyl-β-(p-fluoro)phenethylamine.

8. d-N,α,α-trimethyl - β - ethyl-β-(p-fluoro)phenethylamine compounds according to claim 1.

9. dl-N,α,α - trimethyl-β-ethyl-β-(p-fluoro)phenylethylamine compounds according to claim 1.

10. A hydrochloric acid addition salt according to claim 1 which salt is d-N,α,α - trimethyl-β-ethyl-β-(p-fluoro)phenethylamine hydrochloride.

References Cited

UNITED STATES PATENTS

| | | | |
|---|---|---|---|
| 2,387,873 | 10/1954 | Boon et al. | 260—570.8X |
| 2,443,206 | 6/1948 | Suter | 260—570.8 |
| 3,308,019 | 3/1967 | Kopf et al. | 260—570.8X |
| 3,328,249 | 6/1967 | Aceto et al. | 260—570.8X |
| 3,372,196 | 3/1968 | Engelhardt | 260—570.8 |

FOREIGN PATENTS

| | | | |
|---|---|---|---|
| 985,340 | 3/1965 | Great Britain | 260—570.8 |
| 995,063 | 6/1965 | Great Britain | 260—570.8 |
| 393,306 | 10/1965 | Switzerland | 260—570.8 |

OTHER REFERENCES

Science, "Chemical Abstracts," vol. 60, p. 1647.
Weissberger: "Heterocyclic Compounds," part one, p. 560 (1964).

ROBERT V. HINES, Primary Examiner

U.S. Cl. X.R.

260—239, 465, 501.1, 501.21, 558, 562, 566, 592, 618, 650, 999